United States Patent
Grant et al.

[11] Patent Number: 5,300,258
[45] Date of Patent: Apr. 5, 1994

[54] METHOD FOR DECONTAMINATING SOIL CONTAINING RESINS

[75] Inventors: David C. Grant, Gibsonia; Edward J. Lahoda, Edgewood Borough; Leland L. Learn, Pittsburgh; Arthur W. Ott, Wilkins Township, Allegheny County; Albert J. Dietrich, North Huntingdon Township, Westmoreland County, all of Pa.

[73] Assignee: Westinghouse Electric Corp., Pittsburgh, Pa.

[21] Appl. No.: 722,458

[22] Filed: Jun. 27, 1991

[51] Int. Cl.$^5$ .............................................. G21F 9/00
[52] U.S. Cl. ........................................ 252/626; 209/2
[58] Field of Search ............................ 252/626; 209/2

[56] References Cited

U.S. PATENT DOCUMENTS

| | | | |
|---|---|---|---|
| 4,783,253 | 11/1988 | Ayres | 209/2 |
| 4,783,263 | 11/1988 | Trost et al. | 210/638 |
| 5,045,240 | 9/1991 | Skriba et al. | 252/626 |
| 5,128,068 | 7/1992 | Lahoda et al. | 252/626 |

*Primary Examiner*—Donald P. Walsh
*Assistant Examiner*—Daniel Jenkins

[57] ABSTRACT

A method for removing contaminated resin particles from soils. The method entrains the resin particles and fines from the soil, which, due to the difference in specific gravity between resin and soil particles, results in a significant disparity between particle size of the entrained resin and the entrained fines. This, in turn permits the fines to be screened from the resin and the larger soil particles, which have not been entrained, to settle out from the mixture.

18 Claims, 3 Drawing Sheets

METHOD FOR DECONTAMINATING SOIL CONTAINING RESINS

BACKGROUND OF THE INVENTION

1. Field of the Invention

This invention relates to a method for separating contaminated resins from particulate materials such as soils, which resins are contaminated with a variety of contaminants, such as heavy metals, radioactive compounds and organics, often in combination, through fluidization of the soil/resin mixture, removal of soil particles not fluidized, and separation of the fluidized resins from those soil particles which are fluidized.

2. Background Information

Contaminated soil and groundwater is becoming a more serious environmental problem every day. The contaminants can include heavy metals, such as for instance, copper, lead and mercury; radioactive species, such as for example, radium, uranium and thorium; and organics, such as for example, oils, grease, polychlorinated biphenyls, (PCB's), benzylamine hydrochloride, flue soot and others.

Various techniques have been developed to remove specific contaminants from soil and groundwater. For instance, heavy metals are known to be found predominantly in the silt, humic or clay fraction of soil. Hence, they can sometimes be removed by size separation techniques, such as tiltable tables, concurrent flow in a mineral jig and by chemical techniques, such as the use of leachates. The radioactive compounds, when originating as a spill, can sometimes be removed to a large extent by leaching. Since these compounds are often also present in the finer particles, the most severely contaminated fraction can also be removed by countercurrent flow size separation. Organics can sometimes be removed by washing with surfactants, thermal treatment or biological processes.

Special problems develop when the different types of contaminants are present in the same soil and/or groundwater. Generally, biological or thermal processes are more effective for removing organics than washing, in the case of finer grain soils and clays. However, toxic inorganics such as lead or chromium (+6), if present, tend to deactivate biological systems due to their toxicity and aggravate air pollution problems endemic to thermal destruction processes. In addition, thermal processes may mobilize contaminants that were otherwise fixed in the treated soil.

Radioactive contamination (e.g., uranium, thorium radium, etc.) can sometimes be removed by soil washing, which can provide a means to process soils having multiple contaminants. The washed soil is compatible with subsequent biological or thermal treatment. Inorganic and radioactive compounds may be separated from organics for sale or disposal.

Many soil washing processes are presently available. Most of these processes use mine equipment to provide intimate soil/extractant contact. U.S. Pat. No. 4,783,253 discloses a process for separating radioactive contaminants from soil using a concurrent flow of water to float away lighter uncontaminated particles from heavy contaminated particles. The slurry of lighter particles is dewatered using a spiral classifier, centrifuge, filter or the like. U.S. Pat. No. 4,783,263 is directed to a process for removing toxic or hazardous substances, in particular organics, from soils and the like by converting the material to a slurry, adding surfactants and/or alkaline agents, and concentrating the toxic substance in the liquid phase, preferably with a modifier in a froth flotation cell.

In certain cases, contamination has been found to be concentrated in ion exchange materials that have accidentally been spilled onto the soil. This is likely to be a problem at any mining site or processing facility which utilizes resins in its processes. Also, the addition of resins to contaminated soils has been found to be an effective means for concentrating the contaminants, and thus decontaminating the soil. Because of the high affinity of the ion exchange resins for the contaminants, however, the contaminants cannot be readily extracted or mobilized from the resins. The contaminated resins must therefore be segregated from the soil.

There is thus a need for an improved process for treating particulate materials, such as soil and the like, contaminated with a mixture of wastes such as radioactive materials, organics and heavy metals.

There is yet another need for such a process which is not capital intensive, is economical to operate and can be made portable for on-site treatment.

There is a further need for a system that can effectively recover the contaminants once they have been removed from the soil, requiring a minimal amount of equipment, chemicals, and being portable to the job site, which further allows for the processing of recovered contaminants, such as metals, through mining and/or smelting operations.

There is yet an additional need for such a process which may be used to treat soils which contain contaminated resins, such as ion exchange materials.

As used herein, the term "fluid" is intended to include both compressible and incompressible fluids, such as liquids, gasses, mixtures and solutions thereof.

As used herein, the term "soil" includes all forms of particulate matter to which contaminants may adhere, such as, for example, clay, fines, sand, rock, humus, etc.

As used herein, the term "heavy metal contaminants" includes both radioactive and non-radioactive metals, and is otherwise intended to encompass the full breadth of metal contaminants known to those skilled in the art.

As used herein, the term "organic contaminants" is intended to refer to all organic compounds which tend to adhere to soil, and which present environmental hazards when permitted to remain in the soil or groundwater.

SUMMARY OF THE INVENTION

According to the present invention, a method of decontaminating soil containing resins, for example, ion exchange resins contaminated with organic, heavy metal and/or radioactive contaminants is disclosed. The method comprises fluidizing a soil mixture containing contaminated resin particulates at a fluid velocity sufficient to entrain the resin particles and a portion of the soil particles. Because of the difference in specific gravity of ion exchange resins and soil, the entrained resin particles have an average particle size significantly larger than the entrained soil particles. If the fluidizing velocity is chosen so as to be rapid enough to entrain substantially all of the resin particles, but not similarly-sized soil particles, size separation of the entrained resins from the soil is readily achieved. Soil particles which are too large to be entrained in the fluidized stream are separated, for example, by settling, while those soil particles which have been entrained along with the resin particles are separated using size-selective separating means, such as a mineral jig and screen.

In another preferred embodiment of the invention, oversized soil particles are used in the process to achieve separation of the resin particles, the oversized soil particles having an average particle size tending to provide a tortuous path which inhibits settlement of the contaminated resin particles, and further tending to inhibit channeling of the resin particles in the fluidized mixture.

BRIEF DESCRIPTION OF THE DRAWINGS

The following figures illustrate various aspects of preferred embodiments of the invention, wherein.

DETAILED DESCRIPTION OF THE PREFERRED EMBODIMENTS

The need for the present invention was premised on the belief that certain contaminants, particularly those adherent to resins which are or tend to be in contact with soil, present a difficult problem for removal through typical soil-washing processes.

The method of the present invention for separation of contaminated resin from soil utilizes the fact that the resins generally have a specific gravity (approximately 1.1 for organic ion exchange resins, e.g.) much lower than that of soil (typically about 2.8). By passing a fluid upflow through a bed of soil and resin, the lower density resin can be readily separated from the soil particles of the same size. Using Stoke's Law, the fluid velocity (i.e., terminal velocity) required to entrain a particle of a particular size can be calculated.

During fluid upflow in a solid particle bed, such as in a mineral jig, there occurs fluidization of the solid particles given sufficient fluid velocity. If the fluid velocity exceeds the terminal velocity of the particle, the particle is entrained in the fluid and removed from the bed. The terminal velocity, defined as the velocity eventually attained by a solid particle as it is allowed to fall through a sufficiently high column of a fluid, can be estimated using Stoke's Law:

$$U_t = (p_s - p_f) * g * d^2 / (18 * u)$$

where
$U_t$ = terminal velocity, cm/sec
$p_s$ = solid density, g/cm$^3$
$p_f$ = fluid density, g/cm$^3$
g = gravitational acceleration, cm$^2$/sec
d = particle diameter, cm
u = fluid viscosity, g-cm/sec
for $Re_t = U_t * d * p_f / u < 0.3$ where $Re_t$ is the particle Reynold's number evaluated at the terminal velocity. For $Re_t$ greater than 0.3 and less than 1000, the following modified expression of Stokes's Law can be used:

$$U_t = 0.153 * d^{1.14} * g^{1.71} * (p_s - p_f)^{0.71} / (u^{0.43} * p_f^{0.29})$$

These equations, while only strictly applicable to spherical particles, are used herein to estimate the terminal velocity for soil and resin particles. The estimated terminal velocity as a function of particle size and particle density are given in Table 1 hereinafter.

Figure 1:
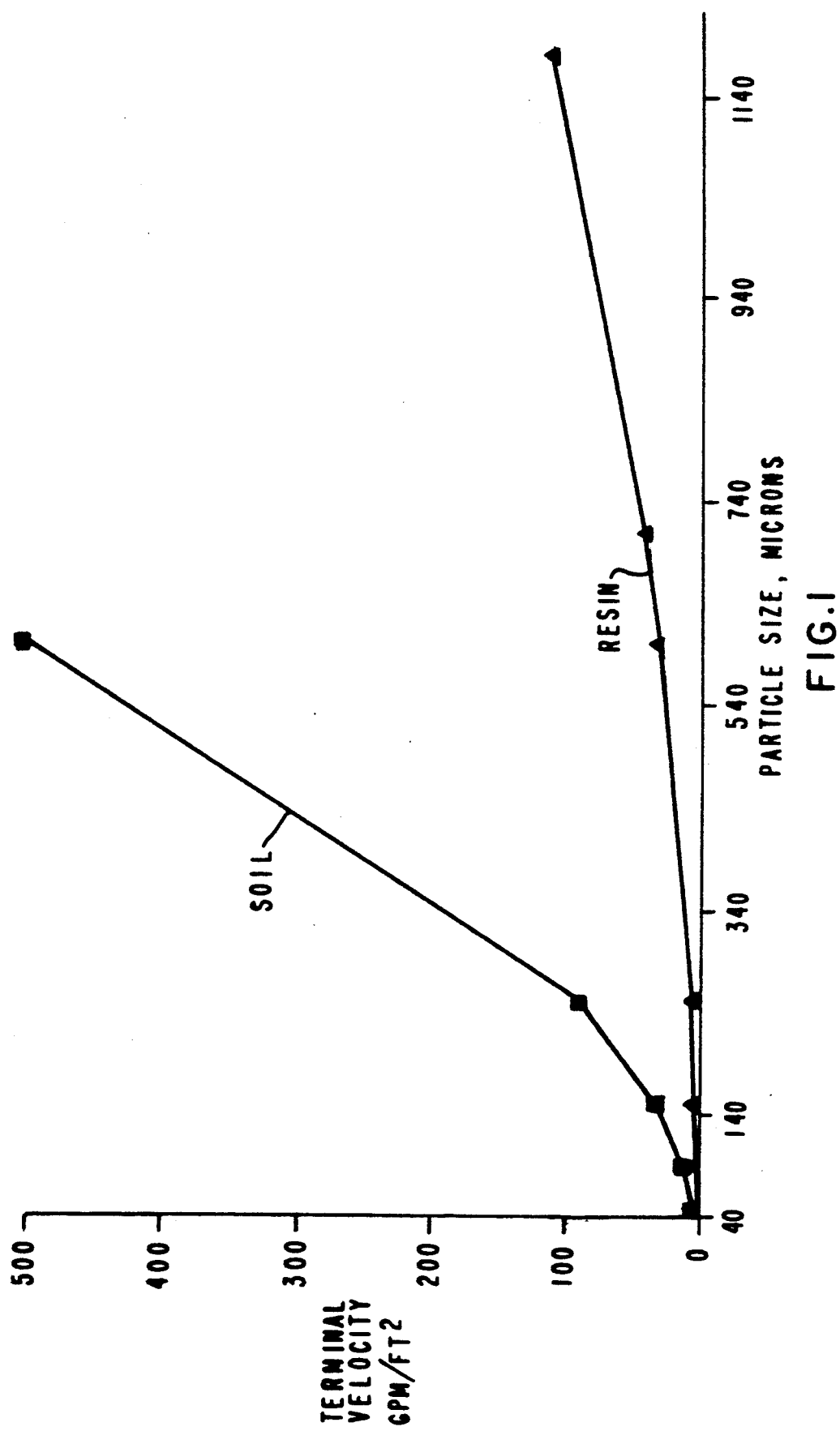
FIG. 1 is a graphic representation demonstrating the advantages of the present invention, illustrating entrainment velocities for resin and soil particles as a function of particle size.

A comparison of the fluid velocities required for entrainment or fluidization of resin and soil in water as a function of particle size is shown in FIG. 1. It is readily apparent that the resin can be separated from the same size soil particles. However, while removing a particular size resin bead, smaller size soil particles will also be removed. For example, while removing 250 micron resin beads, soil particles 44 micron and smaller will also be removed. Based on the significant size difference between the entrained soil and resin, the overflow stream can be screened to collect the resin beads while allowing the smaller size soil particles to pass through.

The method of the present invention thus involves the combination of fluidization of contaminated resin particles and at least a portion of the soil particles at a controlled fluid velocity, and the selective screening of the fluidized effluent. A unique way of achieving this selective separation is with a mining apparatus called a mineral jig (see FIG. 2). The mineral jig as used in the present invention, is operated in a manner which is contrary to its standard use. In a typical ore processing operation, for which the mineral jig is designed, only a relatively minor amount of the highest density fraction of the feed, which is the mineral of interest, is collected in the bottom, or hutch, of the jig. In this normal use, the jig is fed with a slurry through the top, and the jig is pulsed, which induces a pulse on the slurry. Water flows upward through the jig, normally when the pulse is on the down stroke. This pulsing action causes the densest particles to settle more quickly, allowing the lighter, less dense particles to be carried away by the water upflow.

TABLE 1

Terminal Velocity Estimation for Resin and Soil Particles as a Function of Particle Size

| Solid Density (ps) g/ml | Particle Diameter (d) (cm) | Screen Size Mesh | Rev. No. Re (␣U*d*p_f/u) | Terminal Velocity | | | |
|---|---|---|---|---|---|---|---|
| | | | | $U_t$ at Re < 0.3 | | $U_t$ for 0.3 < Re < 1000 | |
| | | | | $U_t$, cm/sec | GPM/ft$^2$ | cm/sec | $U_t$, GPM/ft$^2$ |
| SOIL | | | | | | | |
| 2.8 | 0.118 | 16 | 226.4 | 19.2 | 282.5 | 132.7 | 1953.8 |
| 2.8 | 0.071 | 25 | 76.3 | 10.8 | 158.3 | 18.0 | 707.3 |
| 2.8 | 0.060 | 30 | 53.2 | 8.9 | 130.7 | 34.3 | 505.1 |
| 2.8 | 0.025 | 60 | 8.2 | 3.3 | 48.2 | 6.0 | 87.1 |
| 2.8 | 0.015 | 100 | 2.7 | 1.8 | 26.9 | 2.1 | 31.6 |
| 2.8 | 0.009 | 170 | 0.9 | 1.0 | 15.0 | 0.8 | 11.4 |
| 2.8 | 0.005 | 325 | 0.2 | 0.5 | 6.8 | 0.2 | 2.8 |
| RESIN | | | | | | | |

TABLE 1-continued

Terminal Velocity Estimation for Resin and
Soil Particles as a Function of Particle Size

| Solid Density (ps) g/ml | Particle Diameter (d) (cm) | Screen Size Mesh | Rev. No. Re (IU*d*p$_f$/u) | Terminal Velocity | | | |
|---|---|---|---|---|---|---|---|
| | | | | $U_t$ at Re < 0.3 | | $U_t$ for 0.3 < Re < 1000 | |
| | | | | $U_t$, cm/sec | GPM/ft$^2$ | $U_t$, cm/sec | GPM/ft$^2$ |
| 1.1 | 0.118 | 16 | 29.7 | 2.5 | 37.0 | 7.6 | 111.6 |
| 1.1 | 0.071 | 25 | 10.0 | 1.4 | 20.7 | 2.7 | 40.4 |
| 1.1 | 0.060 | 30 | 7.0 | 1.2 | 17.1 | 2.0 | 28.9 |
| 1.1 | 0.025 | 60 | 1.1 | 0.4 | 6.3 | 0.3 | 5.0 |
| 1.1 | 0.015 | 100 | 0.4 | 0.2 | 3.5 | 0.1 | 1.8 |
| 1.1 | 0.009 | 170 | 0.1 | 0.1 | 2.0 | 0.0 | 0.6 |
| 1.1 | 0.005 | 325 | 0.0 | 0.1 | 0.9 | 0.0 | 0.2 |

NOTES:
a) To calculate $U_t$ at Re < 0.3, $U_t = 0.153*d^{(1.14)}*g^{(0.71)}*p(p - p_f)^{(0.71)}/u^{(0.43)}*p_f^{(0.29)}$.
b) To calculate $U_t$ for 0.3 < Re < 1000, $U_t = (p_s - p_f)*g*d$; < (18*u).
c) It is assumed that only half of the jig area is available to flow (i.e., 50% screen area).
d) pf = fluid density = 1 g/ml;
g = gravitational acceleration = 980 cm/sec$^2$
u = fluid viscosity = 0.01 g-cm/sec The operation of the jig for the resin segregation application of the present invention, however, is modified so that a majority of the soil passes downflow through the jig, and only the resin and soil fines are carried over. This is accomplished by setting a relatively long stroke in the jig, giving the particles more time to settle before the next pulse and by minimizing the bed depth in the jig, preferably using oversized particles in the bed, and using a continuous upflow. In this way, it is actually possible to entrain the resin particles at a fluid velocity lower than the theoretical entrainment velocity. The overflow containing resin and fines is then screened to separate the resin from the fines.

Figure 2:
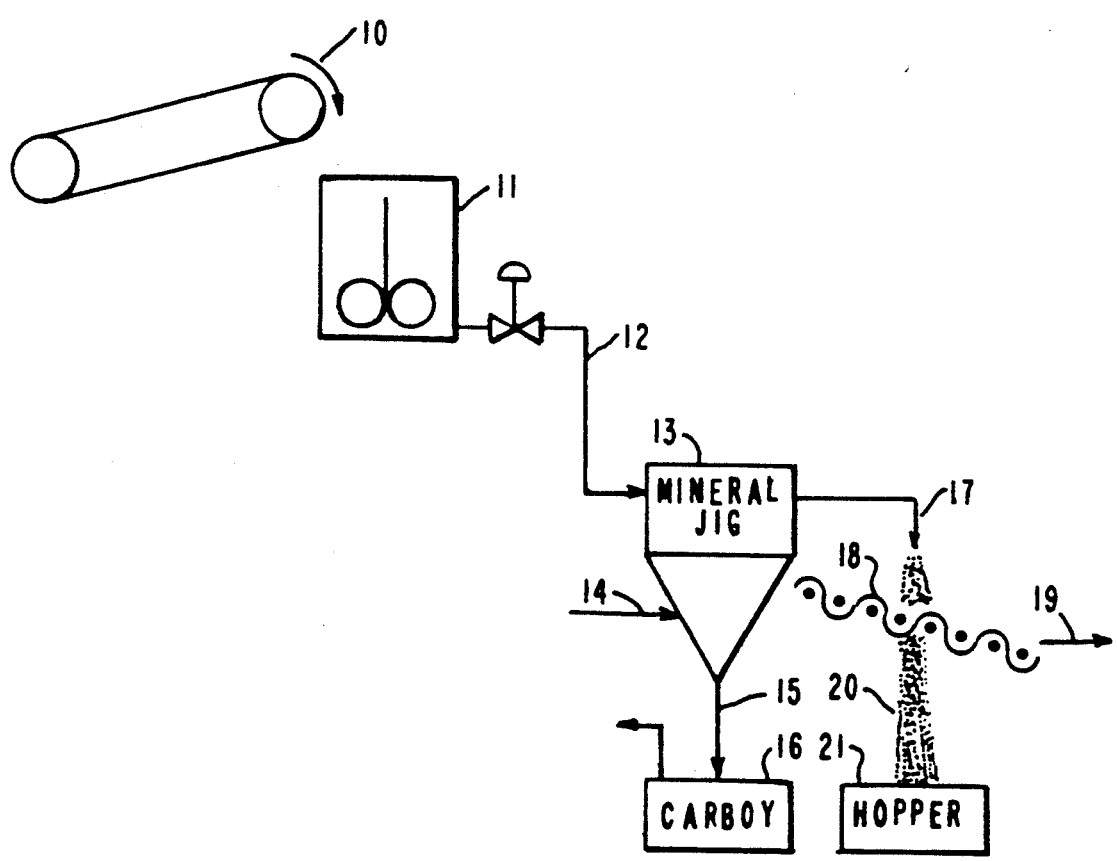
FIG. 2 is a schematic flowchart illustrating a preferred method of the present invention.

Referring to FIG. 2, a preferred method of practicing the invention is illustrated. A mixture of contaminated soil, which contains resin, generally 10, is slurried in any known manner, for example, by blending the mixture with water in a slurry tank 11. This resin/soil mixture may be the product of an accidental resin spill or may be the product of resin which has been intentionally introduced to the soil to remove contaminants from the soil. Fluids other than water could of course be used to form the slurry, such as other liquids (oil, e.g.). Also, gases (such as air, e.g.), can be used to fluidize the resin.

The slurry is fluidized such that the slurry achieves a velocity required to entrain substantially all of the resin particles and a portion of the soil particles, generally the fines. However, the fluid velocity should not be so great as to entrain the entire mixture of soil and resin, or the advantages of separation according to the present invention will be compromised. Over-entrainment would further result in wasted energy.

The slurried mixture may be entrained in any known way, provided the desired terminal or entrainment velocity is reached. Entrainment methods may include the use of pumps, gravity (by developing sufficient head to provide the desired terminal velocity downstream), stirrers, blowers, etc.

The entrained resin and soil are separated from those soil particles which have not been entrained in the fluid. The simplest way of doing this is to allow the soil particles which have not been entrained to settle out by gravity and be collected. This is illustrated schematically in FIG. 2, by the slurried mixture, 12, entering the jig, 13, which is fed with jig water 14. The soil particles which have not been entrained by the jig 13, settle out 15, and are collected as clean soil in a product carboy 16.

Meanwhile, the overflow 17, which passes upflow from the jig 13, has achieved terminal or entrainment velocity and has entrained the resin and at least a portion of the soil, typically fines, is passed through particle size separation means sized to recover the resin, such as a 60 mesh screen 18. The contaminated resin 19 is removed for disposal, thermal destruction, oxidation of contaminants, recovery of heavy metals and the like. The soil-containing stream 20 passes through the particle size separation means resin free and is collected in a hopper 21 for return to the site or further processing. The ability to accomplish the desired resin segregation using this approach is demonstrated in the following example.

EXAMPLE

Figure 3:
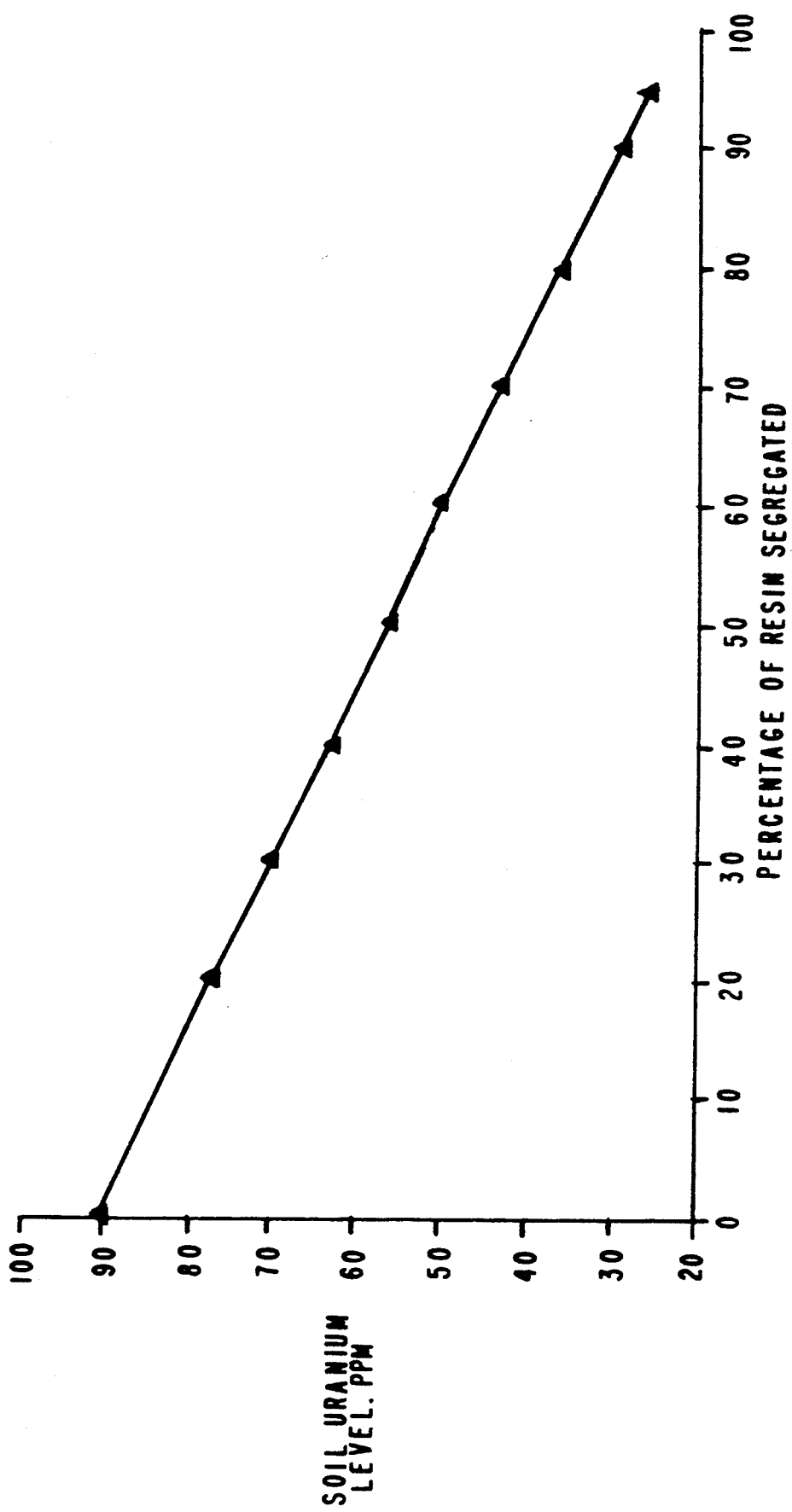
FIG. 3 is graphic representation illustrating the effect of resin segregation on soil uranium level.

Remediation studies on a soil from a uranium solution mining site in Bruni, Tex. had shown that resin contamination was present in certain soil samples. Extractants that were successful at removing the uranium contamination from just soils, were no longer effective on the soils that contained the resin. This was due to the fact the resin (DOWEX 21K, Rohm and Haas, Philadelphia, Pa.) has a high affinity for the uranium, which could not be mobilized by extractants. Chemical analysis of the soil and resin mixture showed the uranium content to be approximately 90 ppm, which is above the required remediation level of 42 ppm. Further analysis showed that a majority of the contamination was associated with the resin. The resin, which represented about 1 weight percent of the soil mixture, contained 7000 ppm uranium. The soil itself contained less than 30 ppm uranium. As shown in FIG. 3, to achieve the desired uranium level in the soil it was thus necessary to segregate at least 70% of the resin from the soil. A particle size analysis of the resin showed that a majority of the resin was greater than 250 microns. Tests were thus run to determine if the resin could be segregated from the soil using a mineral jig to fluidize the resin and a 250 micron screen to collect the resin from the overflow.

The results of the tests, summarized in Table 2, show that under conditions which are run to maximize solid downflow through the jig (Test A), only about 40% of the resin was removed from the soil. Subsequent testing showed that by adding a bed of oversized soil particles the segregation could be greatly improved. The oversized bedding soil was sized (0.19 to 0.25 inch diameter) to prevent its discharge from the bed by entrainment in the overflow stream, but to still allow adequate pulsing of the bed and thus allow the soil being processed to pass through the interstices in the bed. The bedding provides a more tortuous path for the resin to travel to the bottom of the jig, and thus provides much greater opportunity for the resin to be fluidized from the soil by the upflow stream. The bedding also results in better distribution of the solution flow up through the jig, thus minimizing channelling. The results of Table 2 show that with .the use of oversized bedding material, resin segregation of 80% and greater was achieved.

The mineral jig may have a stroke length of up to 0.75 inch with a frequency of 800 rpm. The fluidizing zone of the jig may have dimensions of about 4"×6" to 4 feet×6 feet in surface area with a height of up to about a foot. The important variable for fluidization is flow rate per unit surface area of the zone.

The results of Table 2 also show that the resin segregation can be increased from 80% (Test B) to greater than 90% (Test C) by increasing the upflow rate from 1.6 to 3.2 GPM/ft$^2$. Increasing the flow further to 4.8 GPM/ft$^2$ (Test D) did not significantly increase the resin removal. According to Stoke's Law, fluid velocities of at least 5 GPM/ft$^2$ should have been required to entrain this resin. The pulsing action of the jig and the short fluidization zone in the jig is believed to result in the lower fluid flow rates being required for resin entrainment. Other separation devices (e.g., fluidized beds) will require greater flow rates to achieve the same degree of resin segregation.

Analysis of the soil products, which are the jig bottoms and the jig overflow which passed through the screen (<250 microns), contained less than 30 ppm uranium. These streams represented ~99% of the feed; thus the contamination was effectively concentrated in 1% of the feed which was collected in the overflow 250 micron screen.

TABLE 2

| Test # | Resin Segregation upflow Rate | Particle Bed* | % Resin Removed |
|---|---|---|---|
| A | 4.8 GPM/ft$^2$ | No | 43% |
| B | 1.6 GPM/ft$^2$ | Yes | 80% |
| C | 3.2 GPM/ft$^2$ | Yes | +90% |
| D | 4.8 GPM/ft$^2$ | Yes | +90% |

*Layer of solids in particle bed comprise 0.19-0.25 inch diameter solids.

It will, of course, be appreciated by those skilled in the art that variations to the method of the invention disclosed herein may be practiced without departing from the spirit of the invention as set forth in the following claims. For example, the method of the invention may be used to remove any type of resin containing contaminants from soil, including those resins containing anions. Such anions may include, for example, complexes of uraninium, arsenic and/or chromium, which tend to carry an anionic charge. Of course, cationic exchange resins may also be removed from the soil according to the present invention.

We claim:

1. A method of separating a mixture of contaminated resin particles from soil particles comprising;

a) fluidizing said mixture at a fluid velocity sufficient to entrain substantially all of said resin particles and a first portion of said soil particles, said entrained first portion of said soil particles being of an average particle size smaller than the average particle size of said contaminated resin particles;

b) separating and collecting a second portion of said soil particles from said entrained contaminated resin particles and said entrained first portion of said soil particles, said second portion not being entrained in said fluidized mixture; and c) separating said entrained first portion of said soil particles from said entrained contaminated resin particles with particle separation means adapted to collect particles corresponding to the average particle size of said contaminated resin particles.

2. The method of claim 1 wherein said second portion of said soil particles are separated and collected by settling.

3. The method of claim 1 wherein said first portion of said soil comprises fines, said second portion of said soil comprises the majority of said soil, said particle separation means comprises a screen adapted to collect said contaminated resin particles and allow said fines to pass therethrough, and said fluidizing is achieved with a mineral jig adapted to collect said second portion of said soil in the bottom of said jig and said jig is further adapted to allow said entrained contaminated resin particles and fines to pass in an overflow stream from said mineral jig to said screen.

4. The method of claim 1 wherein said fluidized mixture is passed through a bed of oversized soil particles in order to assist said separation of said contaminated resin particles and said first portion of said soil from said second portion of said soil, said oversized soil particles having an average particle size tending to provide a tortuous path which inhibits settlement of said contaminated resin particles, said oversized soil particles further tending to inhibit channeling of said contaminated resin particles in said fluidized mixture.

5. The method of claim 3 wherein said mineral jig operates at an upflow rate of less than about 5 GPM/ft$^2$.

6. The method of claim 5 wherein said mineral jig operates at an upflow rate of greater than about 1.6 GPM/ft$^2$.

7. The method of claim 1 wherein said contaminated resin particles comprise an ion exchange resin.

8. The method of claim 7 wherein said contaminated resin particles are contaminated with heavy metals or organics.

9. The method of claim 8 wherein said contaminated resin particles are contaminated with uranium.

10. The method of claim 1 wherein said mixture of contaminated resin and soil particles is prepared by first mixing uncontaminated resin with contaminated soil to remove contaminants adherent to said resin from said contaminated soil.

11. The method of claim 10 wherein said contaminants are selected from the group heavy metals, radioactive contaminants and organic contaminants.

12. The method of claim 11 wherein said uncontaminated resin is a cation exchange resins.

13. The method of claim 11 wherein said uncontaminated resin is an anion exchange resin.

14. The method of claim 1, wherein the contaminated resin particles have a specific gravity lower than that of the soil, the fluid velocity in step a) exceeds the terminal velocity of the resin and the soil fines particles, the fluidizing is in a fluid in a mineral jig having long pulse strokes, giving the particle more time to settle before the next pulse and having a minimum bed depth, water is the fluid, and after fluidization said resin particles remain contaminated.

15. A method of separating a mixture of contaminated resin particles from soil particles comprising:
   a) fluidizing a mixture of soil particles, and contaminated resin particles having a specific gravity lower than the soil particles, in a fluid and at a fluid velocity sufficient to entrain substantially all of said contaminated resin particles and a first, fines portion of said soil particles, said entrained first portion of said soil particles being of an average particle size smaller than the average particle size of said contaminated resin particles, where, after fluidization said resin particles remain contaminated; and then
   b) separating and collecting a second portion of said soil particles, comprising a majority of said soil, from said entrained contaminated resin particles and said entrained first, fines portion of said soil particles, said second portion not being entrained in said fluidized mixture; and then
   c) separating said entrained first, fine portion of said soil particles from said entrained contaminated resin particles with particle separation means adapted to collect particles corresponding to the average particle size of said contaminated resin particles.

16. The method of claim 15 wherein said fluidized mixture is passed through a bed of oversized soil particles in order to assist said separation of said contaminated resin particles and said first portion of said soil from said second portion of said soil, said oversized soil particles having an average particle size tending to provide a tortuous path which inhibits settlement of said contaminated resin particles, said oversized soil particles further tending to inhibit channeling of said contaminated resin particles in said fluidized mixture.

17. The method of claim 15 wherein said mixture of contaminated resin and soil particles is prepared by first mixing uncontaminated resin with contaminated soil to remove contaminants adherent to said resin from said contaminated soil.

18. The method of claim 15 wherein the fluid velocity in step a) exceeds the terminal velocity of the resin and soil fines particles, the fluidizing is in a mineral jig having long pulse strokes, giving the particles more time to settle before the next pulse and containing a minimum bed depth, and water is the fluid.

* * * * *